United States Patent
Ogita et al.

(10) Patent No.: US 8,952,978 B2
(45) Date of Patent: Feb. 10, 2015

(54) DISPLAY DEVICE, VIEWING ANGLE CONTROL METHOD, COMPUTER PROGRAM STORAGE DEVICE WITH VIEWING ANGLE CONTROL PROGRAM, AND MOBILE TERMINAL

(75) Inventors: Takeshi Ogita, Tokyo (JP); Takao Yagi, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 522 days.

(21) Appl. No.: 13/102,233

(22) Filed: May 6, 2011

(65) Prior Publication Data

US 2012/0075355 A1 Mar. 29, 2012

Related U.S. Application Data

(60) Provisional application No. 61/387,188, filed on Sep. 28, 2010.

(51) Int. Cl.
G09G 3/36 (2006.01)
G02F 1/1337 (2006.01)
G09G 3/20 (2006.01)

(52) U.S. Cl.
CPC ........ G09G 3/3611 (2013.01); G02F 1/133753 (2013.01); G09G 2320/028 (2013.01);
(Continued)

(58) Field of Classification Search
CPC .......... G09G 3/3696; G09G 2320/068; G09G 2320/028; G09G 3/20; G09G 2358/00; G02F 1/133753
USPC ................. 345/87, 89, 690, 90, 94, 589, 697; 349/33, 75, 77, 192; 707/999, 201
See application file for complete search history.

(56) References Cited

U.S. PATENT DOCUMENTS 5,489,918 A * 2/1996 Mosier ............................ 345/89
2002/0033830 A1* 3/2002 Yamakawa .................... 345/600
(Continued)

FOREIGN PATENT DOCUMENTS

| JP | 2007-017988 | 1/2007 |
| JP | 2008-20750 | 1/2008 |
| JP | 2009-064025 | 3/2009 |

OTHER PUBLICATIONS

Sharp,Electronic Components, VeilView LC (http://www.sharp.co.jp/products/device/about/1cd/veil/index.html).
(Continued)

*Primary Examiner* — Michael J Eurice
(74) *Attorney, Agent, or Firm* — Oblon, Spivak, McClelland, Maier & Neustadt, L.L.P.

(57) ABSTRACT

A display device includes a display panel unit having predetermined viewing angle characteristics. An image data conversion unit is included that converts original image data to be displayed on the display panel unit so that a luminance difference in a low gray level region does not substantially change between before and after conversion and so that a luminance difference in a high gray level region changes in such a manner that a luminance difference obtained after conversion becomes smaller than a luminance difference obtained before conversion. A data holding unit holds predetermined oblique-view image data corresponding to the predetermined viewing angle characteristics of the display panel unit. An image combining unit combines image data obtained through conversion by the image data conversion unit with the predetermined oblique-view image data to generate composite image data. The composite image data is displayed on the display panel unit.

8 Claims, 13 Drawing Sheets

(52) U.S. Cl.
CPC .......... *G09G3/20* (2013.01); *G09G 2320/0271* (2013.01); *G09G 2320/0673* (2013.01); *G09G 2320/068* (2013.01); *G09G 2340/10* (2013.01); *G09G 2358/00* (2013.01)
USPC .......................................... 345/589; 345/697

(56) References Cited

U.S. PATENT DOCUMENTS

| | | | | |
|---|---|---|---|---|
| 2002/0149598 | A1* | 10/2002 | Greier et al. | 345/589 |
| 2003/0020703 | A1* | 1/2003 | Holub | 345/207 |
| 2003/0146893 | A1* | 8/2003 | Sawabe | 345/89 |
| 2004/0207594 | A1* | 10/2004 | Kubo | 345/100 |
| 2006/0197757 | A1* | 9/2006 | Holub | 345/207 |
| 2007/0040780 | A1* | 2/2007 | Gass et al. | 345/87 |
| 2007/0075950 | A1* | 4/2007 | Yamada et al. | 345/89 |
| 2007/0152932 | A1* | 7/2007 | Chung et al. | 345/88 |
| 2007/0252801 | A1* | 11/2007 | Park et al. | 345/88 |
| 2008/0001874 | A1* | 1/2008 | Seo et al. | 345/87 |
| 2008/0107360 | A1* | 5/2008 | Yamashita et al. | 382/313 |
| 2008/0316366 | A1* | 12/2008 | Takatani et al. | 348/705 |
| 2009/0027598 | A1* | 1/2009 | Ikeno et al. | 349/77 |
| 2010/0085373 | A1* | 4/2010 | Miyasaka et al. | 345/589 |
| 2011/0012924 | A1* | 1/2011 | Gass et al. | 345/629 |

OTHER PUBLICATIONS

Mobile phone, Selection of installed various convenient functions including color veilview (http://www.n-keitai.com/n703id/fc.html).
NEC Empowered by Innovation, Product Service of N User guide (http://www.sharp.co.jp/products/sb831sh/text/veilview.html).
Chinese Office Action issued Jul. 29, 2013, in China Patent Application No. 201110201009.5 (with English translation).
Extended Search Report issued Sep. 22, 2011 in European Application No. 11168795.0

* cited by examiner

FIG. 8

|  | FIRST COLUMN | SECOND COLUMN | THIRD COLUMN | FOURTH COLUMN |
|---|---|---|---|---|
| FIRST ROW | R\|G\|B | R\|G\|B | R\|G\|B | R\|G\|B |
| SECOND ROW | R\|G\|B | R\|G\|B | R\|G\|B | R\|G\|B |
| THIRD ROW | R\|G\|B | R\|G\|B | R\|G\|B | R\|G\|B |
| FOURTH ROW | R\|G\|B | R\|G\|B | R\|G\|B | R\|G\|B |

FIG. 9

|  | FIRST COLUMN | | | SECOND COLUMN | | | THIRD COLUMN | | | FOURTH COLUMN | | |
|---|---|---|---|---|---|---|---|---|---|---|---|---|
| FIRST ROW | 0k | 0k | 0k | 0k | 0k | 0k | 30k | 30k | 30k | 30k | 30k | 30k |
| SECOND ROW | 0k | 0k | 0k | 0k | 0k | 0k | 30k | 30k | 30k | 30k | 30k | 30k |
| THIRD ROW | 30k | 30k | 30k | 30k | 30k | 30k | 0k | 0k | 0k | 0k | 0k | 0k |
| FOURTH ROW | 30k | 30k | 30k | 30k | 30k | 30k | 0k | 0k | 0k | 0k | 0k | 0k |

FIG. 10

|  | FIRST COLUMN | | | SECOND COLUMN | | | THIRD COLUMN | | | FOURTH COLUMN | | |
|---|---|---|---|---|---|---|---|---|---|---|---|---|
| FIRST ROW | R | 0k | B | 0k | G | 0k | R | 30k | B | 30k | G | 30k |
| SECOND ROW | 0k | G | 0k | R | 0k | B | 30k | G | 30k | R | 30k | B |
| THIRD ROW | R | 30k | B | 30k | G | 30k | R | 0k | B | 0k | G | 0k |
| FOURTH ROW | 30k | G | 30k | R | 30k | B | 0k | G | 0k | R | 0k | B |

FIG. 11

|  | FIRST COLUMN | | | SECOND COLUMN | | | THIRD COLUMN | | | FOURTH COLUMN | | |
|---|---|---|---|---|---|---|---|---|---|---|---|---|
| FIRST ROW | R | G | B | 0k | 0k | 0k | R | G | B | 30k | 30k | 30k |
| SECOND ROW | 0k | 0k | 0k | R | G | B | 30k | 30k | 30k | R | G | B |
| THIRD ROW | R | G | B | 30k | 30k | 30k | R | G | B | 0k | 0k | 0k |
| FOURTH ROW | 30k | 30k | 30k | R | G | B | 0k | 0k | 0k | R | G | B |

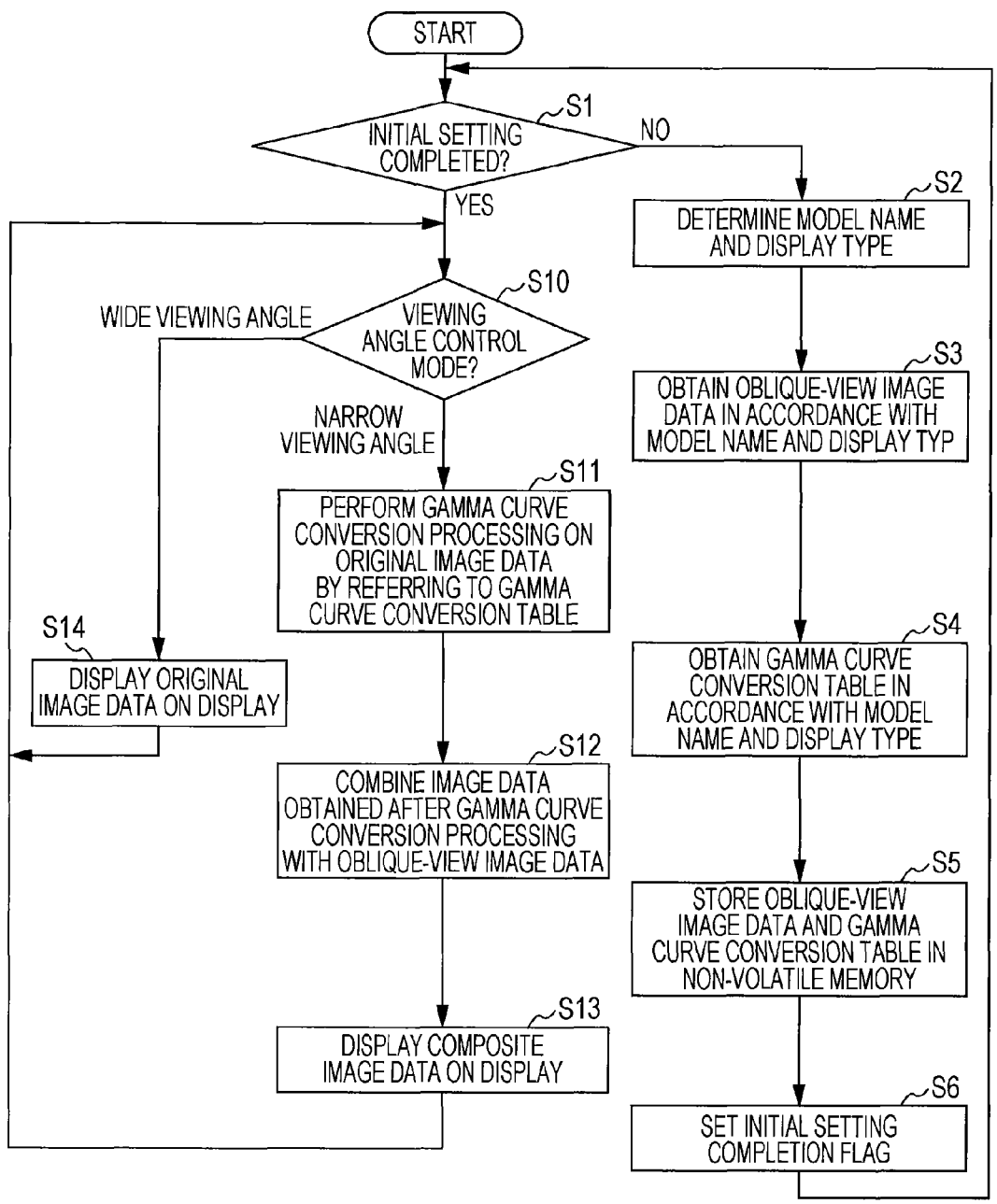

DISPLAY DEVICE, VIEWING ANGLE CONTROL METHOD, COMPUTER PROGRAM STORAGE DEVICE WITH VIEWING ANGLE CONTROL PROGRAM, AND MOBILE TERMINAL

CROSS REFERENCE TO RELATED APPLICATIONS

The present application claims the benefit of the earlier filing date of U.S. Provisional patent application Ser. No. 61/387,188, filed in the United States on Sep. 28, 2010, the entire contents of which being incorporated herein by reference.

BACKGROUND

1. Field

The present disclosure relates to a display device including a liquid crystal display (LCD), a viewing angle control method for the liquid crystal display, computer program storage device with a viewing angle control program, and a mobile terminal.

2. Description of the Related Art

In general, one available method for preventing others from peeping or viewing information or the like displayed on a screen of a liquid crystal display of, for example, a mobile phone terminal is to control the viewing angle of the liquid crystal display.

Three types of methods for controlling the viewing angle of a liquid crystal display are available including first to third viewing angle control methods as follows:

The first viewing angle control method is a method in which, as disclosed in http://www.sharp.co.jp/products/device/about/lcd/veil/index.html, searched Jul. 1, 2010, a liquid crystal display for viewing-angle control is placed on the top of a liquid crystal display for image display and the viewing angle is controlled using the liquid crystal display for viewing-angle control.

The second viewing angle control method is a method in which, as disclosed in http://www.n-keitai.com/n703id/fc.html, searched Jul. 1, 2010, the contrast value of an image displayed on a liquid crystal display is reduced.

The third viewing angle control method is a method in which, as disclosed in http://www.sharp.co.jp/products/sb831sh/text/veilview.html, searched Jul. 1, 2010, data of an image displayed on a liquid crystal display is provided in the form of mixture of front-view image data and oblique-view image data.

Other viewing angle control methods of the related art include techniques disclosed in Japanese Unexamined Patent Application Publications No. 2007-17988 (FIG. 1) and No. 2009-64025 (FIG. 1).

Japanese Unexamined Patent Application Publication No. 2007-17988 discloses a viewing angle control method in which a liquid crystal display panel on which an image is displayed by spatial light modulation, and a circuit that switches liquid crystal of the panel between a first configuration in a first mode in which an image displayed using the liquid crystal display panel is visible from a wide range of viewing angles and a second configuration in a second mode in which an image displayed using the liquid crystal display panel is visible only from a narrow range of viewing angles are provided to facilitate in-plane switching between a public viewing mode and a private viewing mode.

Japanese Unexamined Patent Application Publication No. 2009-64025 discloses a viewing angle control method in which a display device includes, as a display panel, a liquid crystal display panel on which an image is displayed by spatial light modulation, and a circuit that switches, using liquid crystal of the panel, between a first configuration in a first mode in which an image displayed using the liquid crystal display panel is visible from a wide range of viewing angles and a second configuration in a second mode in which an image displayed using the liquid crystal display panel is visible only from a narrow range of viewing angles, and achieves in-plane switching between a public viewing mode and a private viewing mode.

SUMMARY

However, in the first viewing angle control method described above, viewing angle control can be performed in only one direction such as horizontally. Furthermore, the first viewing angle control method uses an additional liquid crystal display for viewing-angle control, resulting in an increase in cost and mechanical thickness.

In the second viewing angle control method described above, due to the reduced contrast of a displayed image, for example, an image viewed in front may appear whitish and become less clearly visible. Furthermore, the second viewing angle control method may provide less effective control of the viewing angle when viewed from oblique directions.

In the third viewing angle control method described above, the process for creating image data to be displayed on a liquid crystal display may be complex, and the amount of calculation may increase as image resolution increases, resulting in an increase in the load on a central processing unit (CPU) or the like. In the techniques described in Japanese Unexamined Patent Application Publications No. 2007-17988 and No. 2009-64025, as in the third viewing angle control method, the image processing may be complex, resulting in an increase in the load on a CPU or the like.

It is therefore desirable to provide a display device, a viewing angle control method, a viewing angle control program, and a mobile terminal that provide a beneficial effect of prevention of peeping or viewing from either side while placing less load on a CPU at no additional cost.

According to an embodiment of the present invention, a display device includes a display panel unit having predetermined viewing angle characteristics, a data holding unit configured to hold predetermined oblique-view image data corresponding to the predetermined viewing angle characteristics of the display panel unit, an image data conversion unit, and an image combining unit. The image data conversion unit is configured to convert original image data to be displayed on the display panel unit so that a luminance difference in a low gray level region does not substantially change between before and after conversion and so that a luminance difference in a high gray level region changes in such a manner that a luminance difference obtained after conversion becomes smaller than a luminance difference obtained before conversion. The image combining unit is configured to combine image data obtained by conversion performed by the image data conversion unit with the predetermined oblique-view image data to generate composite image data. In the display device according to the embodiment, the composite image data generated by the image combining unit is displayed on the display panel unit. Therefore, the display device according to the embodiment may overcome the above difficulties.

According to another embodiment of the present invention, a display device includes a display panel unit having predetermined viewing angle characteristics, a data and table holding unit configured to hold a conversion table used for predetermined gamma curve conversion and predetermined oblique-view image data, which correspond to the predetermined viewing angle characteristics of the display panel unit. The display device according to the embodiment further includes a gamma curve conversion unit configured to perform the predetermined gamma curve conversion on original image data to be displayed on the display panel unit using the conversion table, and an image combining unit configured to combine image data obtained after the gamma curve conversion with the predetermined oblique-view image data to generate composite image data. The composite image data is displayed on the display panel unit. Therefore, the display device according to the embodiment may overcome the above difficulties.

According to another embodiment, a viewing angle control method is a method for controlling a viewing angle of a display device including a display panel unit having predetermined viewing angle characteristics. The viewing angle control method according to the embodiment includes the steps of converting original image data to be displayed on the display panel unit so that a luminance difference in a low gray level region does not substantially change between before and after conversion and so that a luminance difference in a high gray level region changes in such a manner that a luminance difference obtained after conversion becomes smaller than a luminance difference obtained before conversion; combining image data obtained after the conversion with predetermined oblique-view image data corresponding to the predetermined viewing angle characteristics of the display panel unit to generate composite image data; and displaying the composite image data on the display panel unit. Therefore, the viewing angle control method according to the embodiment may overcome the above difficulties.

According to another embodiment, a viewing angle control method is a method for controlling a viewing angle of a display device including a display panel unit having predetermined viewing angle characteristics. The viewing angle control method according to the embodiment includes the steps of performing predetermined gamma curve conversion on original image data using a conversion table used for predetermined gamma curve conversion corresponding to the predetermined viewing angle characteristics of the display panel unit; combining image data obtained after the gamma curve conversion with predetermined oblique-view image data corresponding to the predetermined viewing angle characteristics of the display panel unit to generate composite image data; and displaying the composite image data on the display panel unit. Therefore, the viewing angle control method according to the embodiment may overcome the above difficulties.

According to another embodiment, a viewing angle control program (or a non-transitory computer storage device that holds the program) is a program for controlling a viewing angle of a display device including a display panel unit having predetermined viewing angle characteristics. The viewing angle control program causes the display device to operate as an image data conversion unit configured to convert original image data to be displayed on the display panel unit so that a luminance difference in a low gray level region does not substantially change between before and after conversion and so that a luminance difference in a high gray level region changes in such a manner that a luminance difference obtained after conversion becomes smaller than a luminance difference obtained before conversion, an image combining unit configured to combine image data obtained after the conversion with predetermined oblique-view image data corresponding to the predetermined viewing angle characteristics of the display panel unit to generate composite image data, and a display control unit configured to display the composite image data on the display panel unit. Therefore, the viewing angle control program according to the embodiment may overcome the above difficulties.

According to another embodiment, a viewing angle control program (or non-transitory computer storage device that holds the program) is a program for controlling a viewing angle of a display device including a display panel unit having predetermined viewing angle characteristics. The viewing angle control program causes the display device to operate as a gamma curve conversion unit configured to perform predetermined gamma curve conversion on original image data using a conversion table used for predetermined gamma curve conversion corresponding to the predetermined viewing angle characteristics of the display panel unit, an image combining unit configured to combine image data obtained after the gamma curve conversion with predetermined oblique-view image data corresponding to the predetermined viewing angle characteristics of the display panel unit to generate composite image data, and a display control unit configured to display the composite image data on the display panel unit. Therefore, the viewing angle control program according to the embodiment may overcome the above difficulties.

According to another embodiment of the present invention, a mobile terminal includes a display panel unit having predetermined viewing angle characteristics, a data holding unit configured to hold predetermined oblique-view image data corresponding to the predetermined viewing angle characteristics of the display panel unit, an image data conversion unit, and an image combining unit. The image data conversion unit is configured to convert original image data to be displayed on the display panel unit so that a luminance difference in a low gray level region does not substantially change between before and after conversion and so that a luminance difference in a high gray level region changes in such a manner that a luminance difference obtained after conversion becomes smaller than a luminance difference obtained before conversion. The image combining unit is configured to combine image data obtained after the conversion with the predetermined oblique-view image data to generate composite image data. In the mobile terminal according to the embodiment of the present invention, the composite image data generated by the image combining unit is displayed on the display panel unit. Therefore, the mobile terminal according to the embodiment of the present invention may overcome the above difficulties.

According to another embodiment, a mobile terminal includes a display panel unit having predetermined viewing angle characteristics, and a data and table holding unit configured to hold a conversion table used for predetermined gamma curve conversion and predetermined oblique-view image data, which correspond to the predetermined viewing angle characteristics of the display panel unit. The mobile terminal according to the embodiment of the present invention further includes a gamma curve conversion unit configured to perform the predetermined gamma curve conversion on original image data using the conversion table, and an image combining unit configured to combine image data obtained after the gamma curve conversion with the predetermined oblique-view image data to generate composite image data. The composite image data is displayed on the display panel unit. Therefore, the mobile terminal according to the embodiment may overcome the above difficulties.

Here, in an embodiment, the predetermined oblique-view image data may represent a monochrome image including only data having a gray level in a predetermined range. For example, when the image data can take a gray level ranging from 0 to 255, the predetermined range may be a range from a gray level of 0 to a gray level of 30.

Further, in an embodiment, when each pixel of an image includes a first sub-pixel, a second sub-pixel, and a third sub-pixel, the image combining unit may generate the composite image data by combining image data obtained after conversion performed by the image data conversion unit with the predetermined oblique-view image data alternately on a sub-pixel-by-sub-pixel basis. Alternatively, the image combining unit may generate the composite image data by combining image data obtained after conversion performed by the image data conversion unit with the predetermined oblique-view image data alternately on a pixel-by-pixel basis.

That is, according to this embodiment, composite image data generated by combining image data obtained after conversion performed by the image data conversion unit with predetermined oblique-view image data having a gray level range from 0 to 30 alternately on a sub-pixel-by-sub-pixel basis or on a pixel-by-pixel basis is displayed. Therefore, an embodiment may cause substantially no degradation in the quality of a front-view image while increasing the invisibility of an oblique-view image.

According to an embodiment, furthermore, a conversion table may include a table representing a correspondence between a gray level value and a luminance value with which an oblique-view image that is presented when the display panel unit is viewed from an oblique direction exhibits a luminance difference so that a luminance difference in a low gray level region does not substantially change between before and after gamma curve conversion and so that a luminance difference in a high gray level region changes in such a manner that a luminance difference obtained after gamma curve conversion becomes smaller than a luminance difference obtained before gamma curve conversion. That is, according to the embodiment, gamma curve conversion is performed using a conversion table corresponding to the viewing angle characteristics of the display panel unit. Accordingly, therefore, no calculations are involved in gamma curve conversion.

According to an embodiment, data conversion is performed on desired original image data to be displayed on a display panel unit having predetermined viewing angle characteristics so that a luminance difference in a low gray level region does not substantially change between before and after conversion while a luminance difference in a high gray level region changes in such a manner that a luminance difference obtained after conversion becomes smaller than a luminance difference obtained before conversion. Further, resulting image data is combined with predetermined oblique-view image data corresponding to the predetermined viewing angle characteristics of the display panel unit, and resulting composite image data is displayed on the display panel unit. Therefore, according to an embodiment, a beneficial effect of prevention of peeping or viewing from either side while placing less load on a CPU at no additional cost can be achieved.

According to an embodiment, furthermore, predetermined gamma curve conversion is performed on original image data using a conversion table used for predetermined gamma curve conversion corresponding to the predetermined viewing angle characteristics of a display panel unit, and image data obtained after the gamma curve conversion is combined with predetermined oblique-view image data corresponding to the predetermined viewing angle characteristics of the display panel unit to generate composite image data. The composite image data is displayed on the display panel unit. Therefore, according to an embodiment, a beneficial effect of prevention of peeping or viewing from either side can be achieved without placing load on a CPU or without additional cost.

BRIEF DESCRIPTION OF THE DRAWINGS

FIG. 8 is a diagram illustrating a typical pixel array of a liquid crystal panel of a display device;

FIG. 9 is a diagram illustrating a pixel array corresponding to oblique-view image data according to the embodiment;

FIG. 10 is a diagram illustrating a pixel array corresponding to composite image data obtained in a first example of processing for combining image data obtained after gamma curve conversion processing with oblique-view image data, in which the image data obtained after gamma curve conversion processing and the oblique-view image data are combined on a sub-pixel-by-sub-pixel basis;

FIG. 11 is a diagram illustrating a pixel array corresponding to composite image data obtained in a second example of processing for combining image data obtained after gamma curve conversion processing with oblique-view image data, in which the image data obtained after gamma curve conversion processing and the oblique-view image data are combined on a pixel-by-pixel basis;

FIG. 13 is a flowchart illustrating a flow of a process performed when a control/calculation unit executes a viewing angle control application program obtained by a mobile phone terminal according to the embodiment.

DESCRIPTION OF THE EMBODIMENTS

Figure 1:
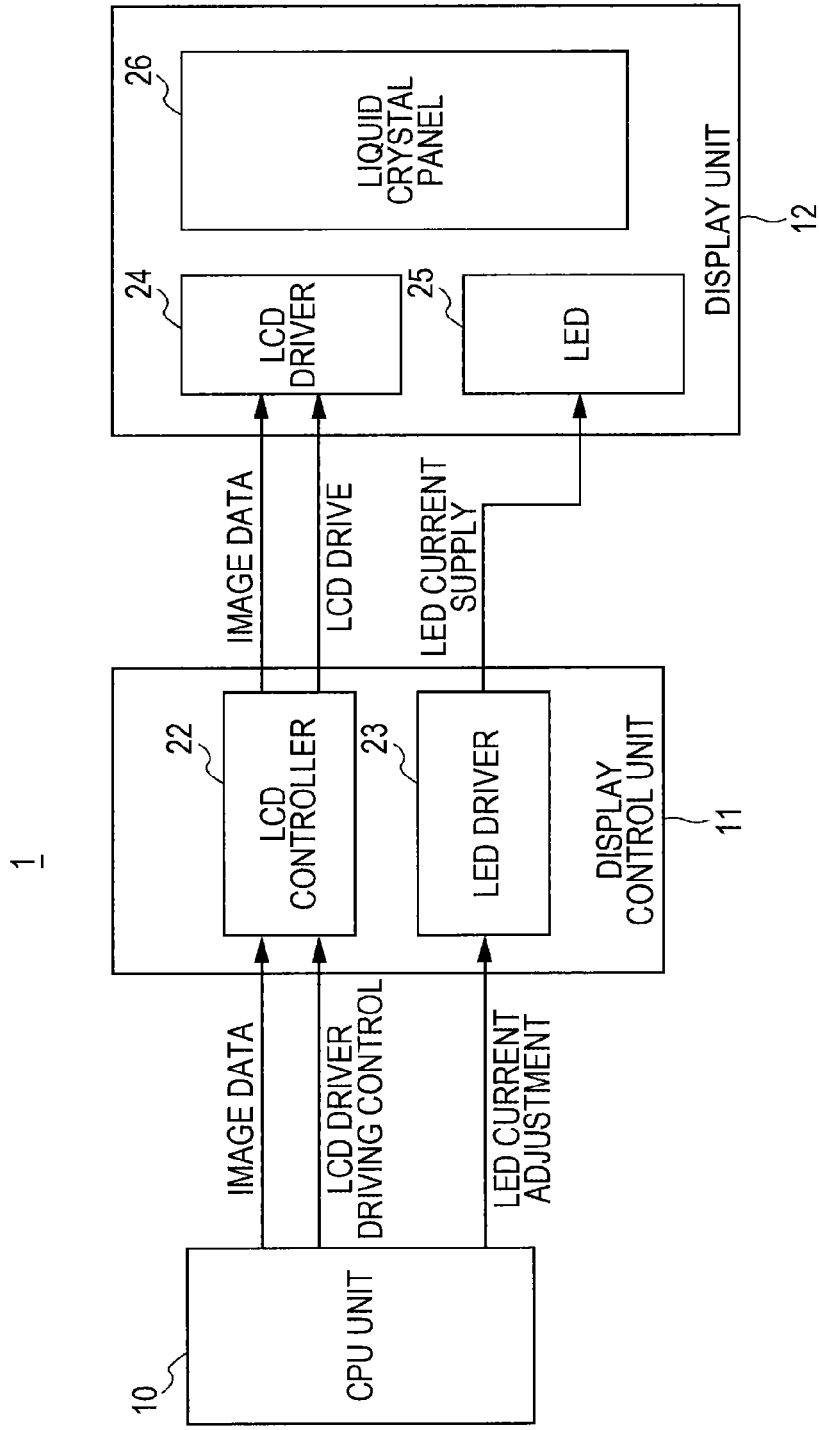
FIG. 1 is a block diagram illustrating a schematic configuration of main components of a display device according to an embodiment.

An embodiment will be described hereinafter with reference to the drawings.
Main Components FIG. 1 illustrates a schematic configuration of main components of a display device 1 according to an embodiment. The display device 1 according to the embodiment may be used as a display unit of any desired device such as a mobile phone terminal, a personal digital assistant (PDA), a notebook personal computer, a mobile game console, a mobile digital television receiver, or a mobile navigation terminal.

Referring to FIG. 1, the display device 1 according to the embodiment includes, as main components, a CPU unit 10, a display control unit 11, and a display unit 12. The display device 1 according to the embodiment further includes other components mounted in a general device, such as a power supply unit, an operation unit, and an external communication unit, which will not be described or illustrated herein.

The CPU unit 10 generates image data to be displayed on a liquid crystal panel 26 of the display unit 12, and an LCD driver driving control signal of the display unit 12, and outputs the image data and the LCD driver driving control signal to the display control unit 11. The CPU unit 10 also generates a light emitting diode (LED) current adjustment signal, and outputs the LED current adjustment signal to an LED driver 23 of the display control unit 11.

The display control unit 11 includes an LCD controller 22 and the LED driver 23. The LCD controller 22 outputs the image data supplied from the CPU unit 10 to an LCD driver 24 of the display unit 12 provided subsequently. Further, the LCD controller 22 generates an LCD drive signal based on the LCD driver driving control signal supplied from the CPU unit 10, and outputs the LCD drive signal to the LCD driver 24. The LED driver 23 generates an LED driving current based on the LED current adjustment signal supplied from the CPU unit 10, and outputs the LED driving current to an LED 25 of the display unit 12 provided subsequently.

The display unit 12 is configured to include the liquid crystal panel 26, the LCD driver 24, and the LED 25. The liquid crystal panel 26 may be, for example, an LCD panel of the vertical alignment (VA) type, the twisted nematic (TN) type, the electrically controlled birefringence (ECB) type, or any other suitable type. The LCD driver 24 supplies the LCD drive signal supplied from the display control unit 11, provided previously, to the liquid crystal panel 26, and activates each pixel of the liquid crystal panel 26 in accordance with the image data supplied from the display control unit 11. The LED 25 emits light in accordance with the LED driving current supplied from the LED driver 23 of the display control unit 11. Thus, an image based on the image data is displayed on the liquid crystal panel 26.

In the display device 1 according to the embodiment, the CPU unit 10 may implement the function of the LCD controller 22. In this case, the image data and the LCD drive signal are output from the CPU unit 10, and are supplied to the LCD driver 24.

Characteristics of Liquid Crystal Panel

In the display device 1 according to the embodiment, as described above, the liquid crystal panel 26 may be of any of the VA type, the TN type, and the ECB type.

Figure 2:
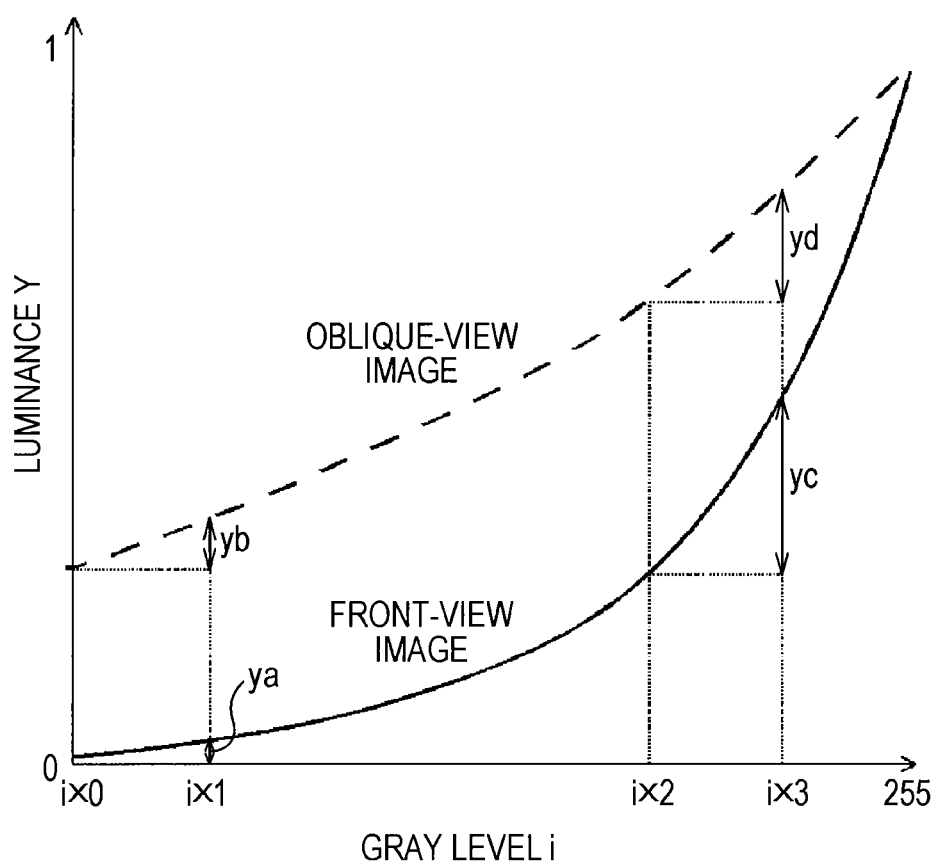
FIG. 2 is a graph illustrating gamma curves for luminance of a liquid crystal panel of the VA type.

Here, when a liquid crystal panel of the VA type is used, as illustrated in FIG. 2, a gamma curve for luminance of the liquid crystal panel of the VA type fluctuates depending on the angle at which the liquid crystal panel is viewed, that is, the viewing angle. In FIG. 2, the abscissa represents gray level i of color, and the ordinate represents luminance Y. The luminance Y is set to "0" when the gray level i of the liquid crystal panel is "0" (black) as viewed from the front, and the luminance Y is set to "1" when the gray level i of the liquid crystal panel is "255" (white) as viewed from the front. In FIG. 2, furthermore, a curve indicated by a solid line represents a gamma curve for a front-view image that is presented when the liquid crystal panel is viewed from the front, and a curve indicated by a dotted line represents a gamma curve for an oblique-view image that is presented when the liquid crystal panel is viewed from an oblique direction.

As illustrated in FIG. 2, as may be seen from the comparison between the gamma curve for the oblique-view image and the gamma curve for the front-view image, a liquid crystal panel of the VA type exhibits a larger luminance difference of the gamma curve for the oblique-view image than the luminance difference of the gamma curve for the front-view image in the low gray level region. In the high gray level region, on the other hand, the luminance difference of the gamma curve for the oblique-view image is smaller than the luminance difference of the gamma curve for the front-view image. In other words, in the low gray level region, the tangent to the gamma curve for the oblique-view image has a greater angle than the tangent to the gamma curve for the front-view image. Thus, in the low gray level region, a luminance difference yb between gray levels $i\times0$ and $i\times1$ for the oblique-view image is larger than a luminance difference ya between gray levels $i\times0$ and $i\times1$ for the front-view image. In the high gray level region, on the other hand, the tangent to the gamma curve for the oblique-view image has a smaller angle than the tangent to the gamma curve for the front-view image. Thus, in the high gray level region, a luminance difference yd between gray levels $i\times2$ and $i\times3$ for the oblique-view image is greater than a luminance difference yc between gray levels $i\times2$ and $i\times3$ for the front-view image.

While the example in FIG. 2 illustrates only the VA type by way of example, the TN type and the ECB type also have similar characteristics.

Viewing Angle Control Utilizing Viewing Angle Characteristics of Liquid Crystal Panel The display device 1 according to the embodiment utilizes the viewing angle characteristics of the liquid crystal panel 26 described above to facilitate viewing-angle control that allows an image displayed on the liquid crystal panel 26 to be clearly visible when viewed from the front and that allows an image displayed on the liquid crystal panel 26 to be substantially invisible when viewed from an oblique direction.

That is, in the embodiment, the viewing angle control described above is implemented by performing data conversion on the original image data to be displayed on the liquid crystal panel 26 so that the luminance difference in the low gray level region does not substantially change between before and after the conversion while, in the high gray level region, the luminance difference after the conversion becomes smaller than that before the conversion, by combining the image data obtained after the conversion with predetermined oblique-view image data corresponding to the viewing angle characteristics of the liquid crystal panel 26, and by using resulting composite image data as display data to be displayed on the liquid crystal panel 26. More specifically, in the embodiment, the viewing angle control is implemented by, as illustrated in FIG. 3, performing predetermined gamma curve conversion processing on original image data OP using a conversion table described below in accordance with the viewing angle characteristics of the liquid crystal panel 26, by combining image data CP obtained after the gamma curve conversion processing with predetermined oblique-view image data SP corresponding to the viewing angle characteristics of the liquid crystal panel 26, and by using resulting composite image data VP as display data to be displayed on the liquid crystal panel 26.

Figure 3:
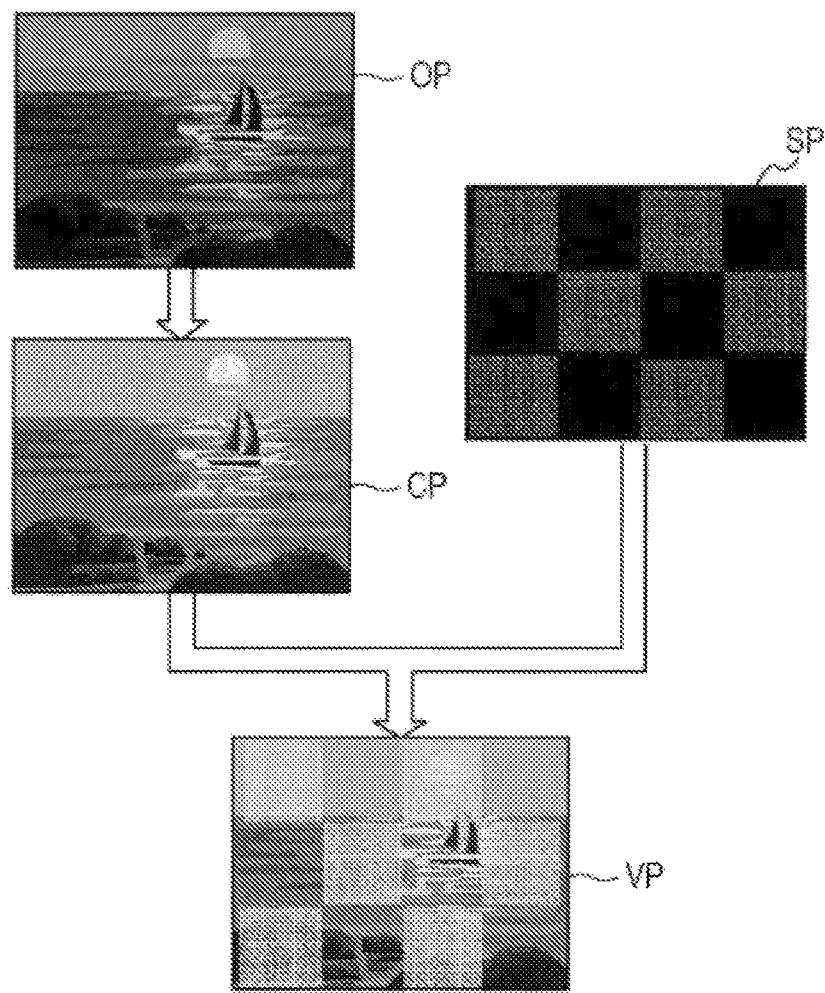
FIG. 3 is a diagram illustrating transitions of images based on image data obtained by gamma curve conversion processing and oblique-view image data combining processing, which are performed by the display device according to the embodiment, in a narrow viewing angle mode.
Figure 4:
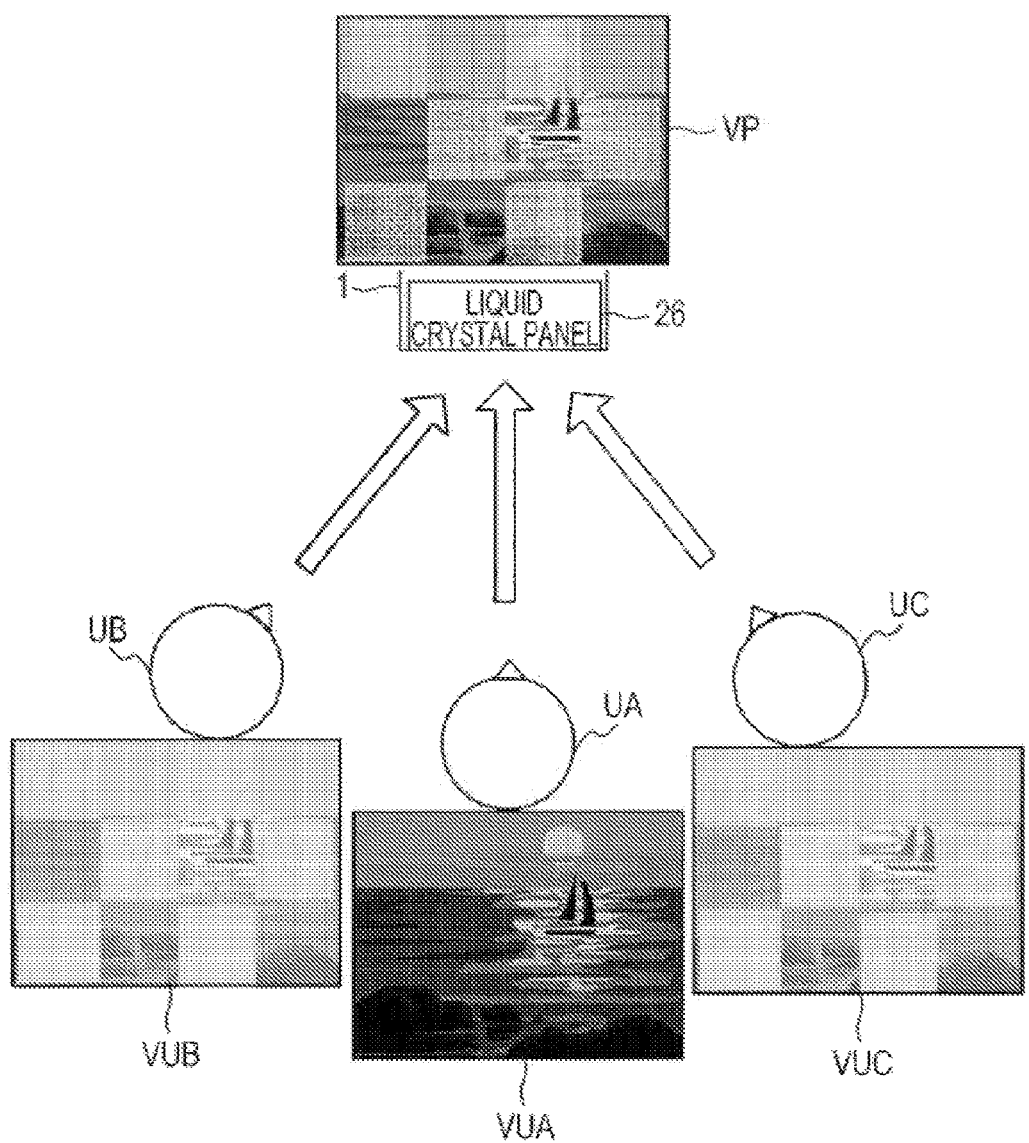
FIG. 4 is a diagram illustrating a front-view image and oblique-view images when the display device according to the embodiment is in the narrow viewing angle mode.

In the embodiment, the composite image data VP illustrated in FIG. 3 is displayed on the liquid crystal panel 26. Thus, as illustrated in FIG. 4, a user UA located substantially in front of the liquid crystal panel 26 can view a display image (front-view image VUA) that is substantially the same as an image displayed based on the original image data OP. In contrast, users UB and UC located at oblique angles with respect to the liquid crystal panel 26 can view images such as oblique-view images VUB and VUC illustrated in FIG. 4, respectively, and are not substantially allowed to view the front-view image VUA viewed by the user UA.

Figure 5:
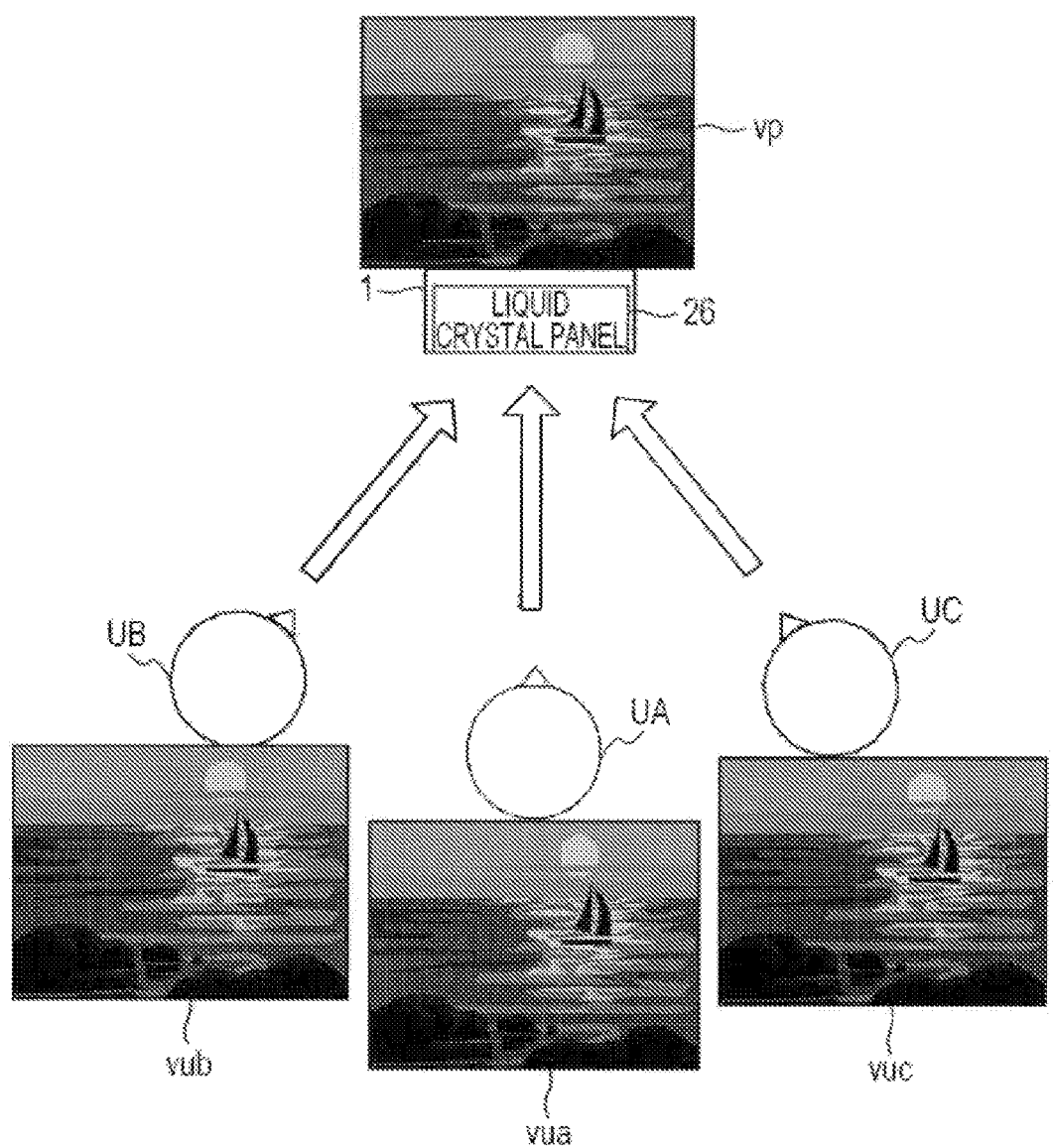
FIG. 5 is a diagram illustrating a front-view image and oblique-view images when the display device according to the embodiment is in a wide viewing angle mode.

The display device 1 according to the embodiment is capable of providing a narrow viewing angle mode that, as illustrated in FIGS. 3 and 4, reduces the viewing angle to prevent peeping or viewing from oblique directions and a wide viewing angle mode that, as illustrated in FIG. 5, directly uses the original image data OP as display image data vp to be displayed on the liquid crystal panel 26 to allow the users UA, UB, and UC to view the images vua, vub, and vuc, respectively, which are substantially the same. The display device 1 according to the embodiment is further capable of appropriately switching between the narrow viewing angle mode and the wide viewing angle mode in accordance with an instruction from a user or by automatic control of the display device 1 itself.

Details of Gamma Curve Conversion Processing in Narrow Viewing Angle Mode

In the embodiment, the predetermined gamma curve conversion processing performed on the original image data OP in the narrow viewing angle mode is performed using a conversion table which may be generated or provided in advance based on the following calculation.

Figure 6:
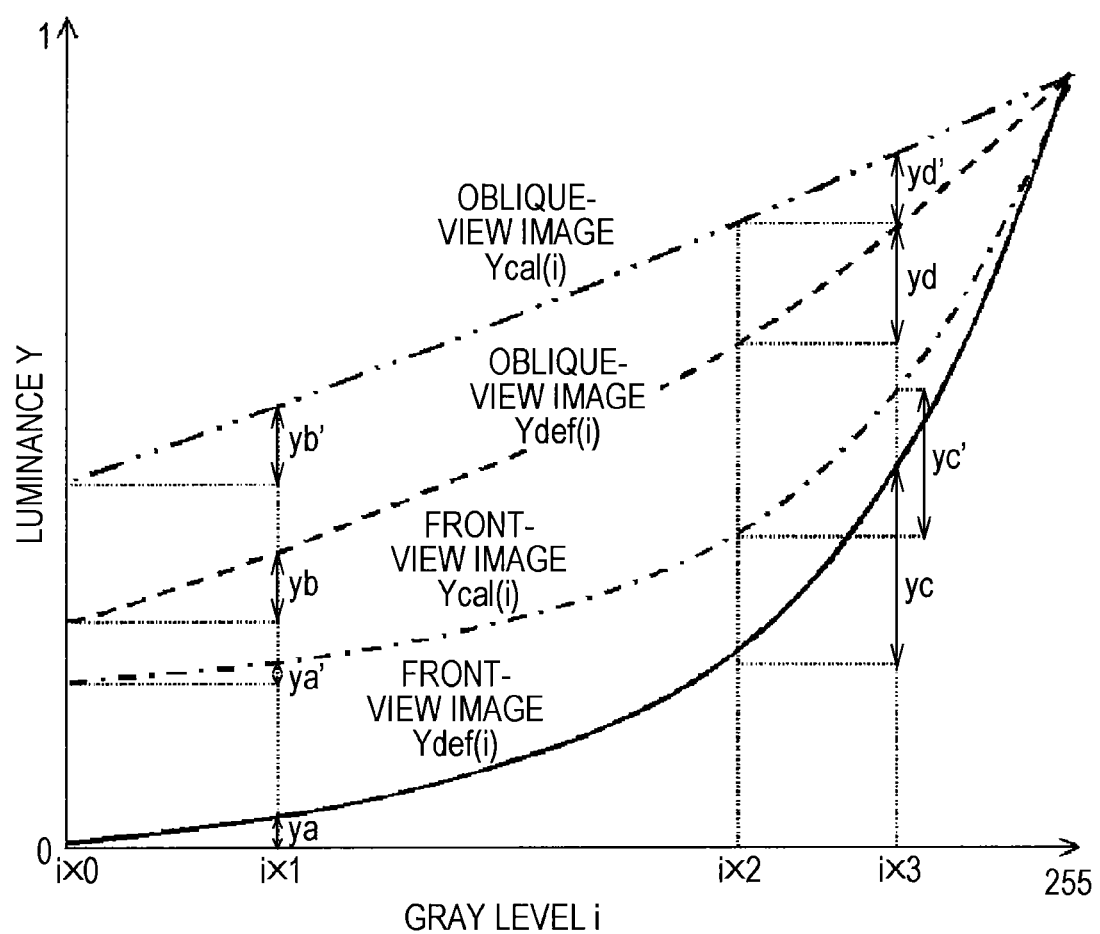
FIG. 6 is a graph illustrating gamma curves of a liquid crystal panel of the VA type and gamma curves obtained after predetermined gamma curve conversion calculation.

FIG. 6 illustrates gamma curves of a liquid crystal panel of the VA type, and gamma curves obtained after the predetermined gamma curve conversion calculation. In FIG. 6, the abscissa represents gray level i of color, and the ordinate represents luminance Y. The luminance Y is set to "0" when the gray level i of the liquid crystal panel is "0" (black) as viewed from the front, and the luminance Y is set to "1" when the gray level i of the liquid crystal panel is "255" (white) as viewed from the front. In FIG. 6, furthermore, a curve indicated by a solid line represents, as in FIG. 2, a gamma curve obtained before gamma curve conversion calculation for a front-view image presented when the liquid crystal panel is viewed from the front, and a curve indicated by a dotted line represents, as in FIG. 2, a gamma curve obtained before gamma curve conversion calculation for an oblique-view image presented when the liquid crystal panel is viewed from an oblique direction. In FIG. 6, furthermore, a curve indicated by a one-dot chain line represents a gamma curve obtained after gamma curve conversion calculation for a front-view image presented when the liquid crystal panel is viewed from the front, and a curve indicated by a two-dot chain line represents a gamma curve obtained after gamma curve conversion calculation for an oblique-view image presented when the liquid crystal panel is viewed from an oblique direction.

Here, gamma curve conversion calculation is represented by Equations (1) to (4) as follows:

$$Ycal(i)=A \times Ydef(i)+B \qquad (1)$$

$$A=(Ydef(255)-C)/(Ydef(255)-Ydef(0)) \qquad (2)$$

$$B=\{(C-Ydef(0)) \times Ydef(255)\}/(Ydef(255)-Ydef(0)) \qquad (3)$$

$$C=Ydef(255)/CRcal \qquad (4)$$

where i denotes the gray level (ranging from 0 to 255) of a color input in the wide viewing angle mode, Ycal(i) denotes the luminance at the i-th gray level after the conversion calculation, Ydef(i) denotes the actual luminance of the liquid crystal panel at the i-th gray level before the conversion cal-culation, and CRcal denotes the pseudo-contrast value for display (in the embodiment, for example, the contrast value may be less than 10).

In Equations (1) to (4), Ycal(i) at gray levels i ranging from 0 to 255 is determined.

Figure 7:
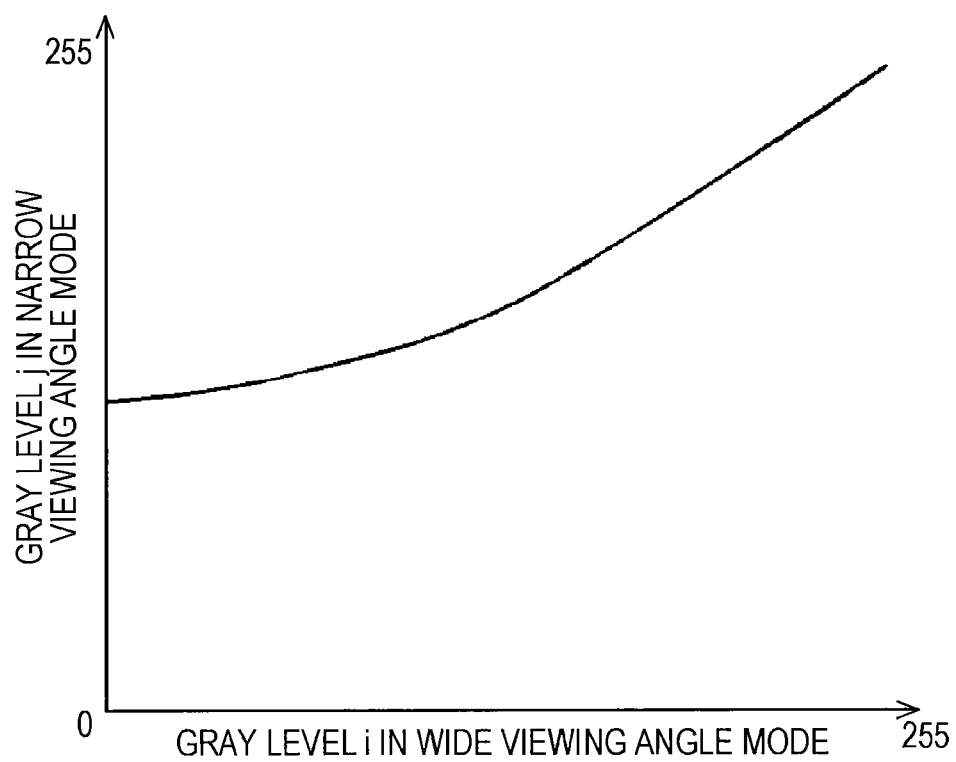
FIG. 7 is a graph illustrating gray levels in the narrow viewing angle mode and gray levels in the wide viewing angle mode.

After that, a conversion table of gray levels j and i is calculated so as to obtain the relationship given by Equation (5) below.

$$Ycal(i) \approx Ydef(j) \qquad (5)$$

where j denotes the gray level (ranging from 0 to 255) of a color input in the narrow viewing angle mode. The gray levels j and i have a relationship illustrated in FIG. 7. In FIG. 7, the abscissa represents the gray level i in the wide viewing angle mode, and the ordinate represents the gray level j in the narrow viewing angle mode. Each of the gray levels i and j has a range from 0 to 255.

Thereafter, in the embodiment, in the narrow viewing angle mode, the image data CP obtained after gamma curve conversion processing, which is obtained by performing gamma curve conversion processing on the original image data OP, is generated using the conversion table representing the correspondence between the gray level and the luminance described above, according to Equation (6) as follows.

$$j=X(i) \qquad (6)$$

In the embodiment, when the gamma curves obtained before and after the gamma curve conversion processing are compared, as illustrated in FIG. 6, the gamma curves for the front-view image indicate that the luminance Ycal(i) obtained after the gamma curve conversion processing is higher than the luminance Ydef(i) obtained before the gamma curve conversion processing. Further, the gamma curves for the oblique-view image indicate that the luminance differences obtained before and after the gamma curve conversion processing are not different so much in the low gray level region while, in the high gray level region, the luminance difference obtained after the gamma curve conversion processing is smaller than the luminance difference obtained before the gamma curve conversion processing. That is, as in FIG. 2 described above, when a luminance difference between gray levels i×0 and i×1 in the low gray level region and a luminance difference between gray levels i×2 and i×3 in the high gray level region are compared by way of example, a luminance difference yb obtained before the gamma curve conversion processing and a luminance difference yb' obtained after the gamma curve conversion processing are not different so much in the low gray level region while, in the high gray level region, a luminance difference yd' obtained after the gamma curve conversion processing is smaller than a luminance difference yd obtained before the gamma curve conversion processing.

Therefore, in the display device 1 according to the embodiment, in the narrow viewing angle mode, as illustrated in FIG. 4 described above, the front-view image VUA is made clearly visible while the oblique-view images VUB and VUC are made less visible due to the small luminance difference. In the display device 1 according to the embodiment, furthermore, in the narrow viewing angle mode, a gamma curve for a front-view image is set so that the luminance obtained after the gamma curve conversion processing is higher than that obtained before the gamma curve conversion processing, and a gamma curve for an oblique-view image is set so that the luminance difference does not substantially change between before and after the gamma curve conversion processing in the low gray level region. This prevents a front-view image from being less visible because of the level of darkness when combined with the oblique-view image data SP.

Oblique-View Image Data in Narrow Viewing Angle Mode

In the embodiment, in the narrow viewing angle mode, the predetermined oblique-view image data SP to be combined with the image data CP obtained after the gamma curve conversion processing may be provided in advance as, for example, the following image data. In the following description, the gray level of the image data can take a value in the range of 0 to 255.

The oblique-view image data SP in the embodiment may correspond to an image having a gray level, for example, ranging from 0 to 30. The gray level of 30 is merely an example, and any other gray level value may be used. It is preferable that an optimum value be used depending on the liquid crystal panel being used. Further, only the gray levels of 0 and 30 among the gray levels ranging from 0 to 30 may be used as the gray levels of the oblique-view image data. With the use of only the gray levels of 0 and 30, the oblique-view image data SP may make its display image much less visible in the narrow viewing angle mode when the liquid crystal panel 26 is viewed from oblique directions.

The oblique-view image data SP in the embodiment may represent a monochrome image. Therefore, a monochrome image used as the oblique-view image data SP may prevent a display image when viewed from the front from being less visible due to the degradation by the oblique-view image data SP.

The oblique-view image data SP in the embodiment may also be image data of any other desired pattern such as a geometric pattern, characters, or a picture, and has no limitation.

Processing for Combining Image Data Obtained After Gamma Curve Conversion Processing with Oblique-View Image Data In the display device 1 according to the embodiment, in the narrow viewing angle mode, the image data CP obtained after the gamma curve conversion processing and the oblique-view image data SP are combined, and the resulting composite image data VP is used as display data to be displayed on the liquid crystal panel 26.

The image data combining processing will be described hereinafter with reference to FIGS. 8 to 11.

FIGS. 8 to 11 illustrate pixel arrays in a liquid crystal panel of a display device.

FIG. 8 illustrates a typical pixel array in a liquid crystal panel. As illustrated in FIG. 8, each pixel of a liquid crystal panel is composed of three sub-pixels, that is, first to third sub-pixels, corresponding to three colors, red (R), green (G), and blue (B). In the embodiment, the color of the first sub-pixel may be R, the color of the second sub-pixel may be G, and the color of the third sub-pixel may be B.

Here, in the following description, each of the three, first to third sub-pixels of the pixel at the n-th row and m-th column (where n and m are natural numbers greater than or equal to 1) of the pixel array is represented by (n, m, color). That is, in the embodiment, for example, the first sub-pixel (R sub-pixel) of the pixel at the first row and first column is represented by (1, 1, R), the G sub-pixel of the pixel at the first row and first column is represented by (1, 1, G), and the B sub-pixel of the pixel at the first row and first column is represented by (1, 1, B). Similarly, for example, the R sub-pixel of the pixel at the second row and third column is represented by (2, 3, R), the G sub-pixel of the pixel at the second row and third column is represented by (2, 3, G), and the B sub-pixel of the pixel at the second row and third column is represented by (2, 3, B). The sub-pixels of the pixels at the other rows and columns are also represented in a similar manner.

In the embodiment, furthermore, each of the pixels of the oblique-view image data SP which represents a monochrome image has three, first to third sub-pixels all of which have the same gray level. The three, first to third sub-pixels of each pixel of the oblique-view image data SP are arranged so as to correspond to the three, R, G, and B sub-pixels described above. If a monochrome gray level of the first to third sub-pixels of the oblique-view image data SP is represented by "K", for example, each of the three, first to third sub-pixels of the pixel at the n-th row and m-th column is represented by (1, 1, K). In the embodiment, as described above, the oblique-view image data SP may be data having gray levels of, for example, 0 and 30. Therefore, if the gray level of 0 is represented by K="0 k" and the gray level of 30 is represented by K="30 k", for example, each of the three, first to third sub-pixels of the pixel at the n-th row and m-th column is represented by (1, 1, 0 k) or (1, 1, 30 k).

In the embodiment, furthermore, the oblique-view image data SP may be configured such that, by way of example, sub-pixels each having a gray level of 0 and sub-pixels each having a gray level of 30 are arranged alternately on a macro-pixel-by-macro-pixel basis, where each macro-pixel has q rows and q columns of pixels, i.e., q×q pixels (where q is a natural number greater than or equal to 1). FIG. 9 illustrates an example in which, by way of example, sub-pixels each having a gray level of 0 and sub-pixels each having a gray level of 30 are arranged alternately on a macro-pixel-by-macro-pixel basis, where each macro-pixel has two rows and two columns of pixels, i.e., 2×2=4 pixels. In the example illustrated in FIG. 9, specifically, the macro-pixel having the four pixels at the first row and first column, the first row and second column, the second row and first column, and the second row and second column is configured such that the first to third sub-pixels of each pixel have a gray level of 0 ("0k"), and the macro-pixel having the four pixels at the first row and third column, the first row and fourth column, the second row and third column, and the second row and fourth column is configured such that the first to third sub-pixels of each pixel have a gray level of 30 ("30k"). Similarly, the macro-pixel having the four pixels at the third row and first column, the third row and second column, the fourth row and first column, and the fourth row and second column is configured such that the first to third sub-pixels of each pixel have a gray level of 30 ("30k"), and the macro-pixel having the four pixels at the third row and third column, the third row and fourth column, the fourth row and third column, and the fourth row and fourth column is configured such that the first to third sub-pixels of pixel have a gray level of 0 ("0k"). The sub-pixels of the pixels at the other rows and columns are also represented in a similar manner.

FIG. 10 illustrates pixels obtained in a first example of processing for combining the image data CP obtained after the gamma curve conversion processing with the oblique-view image data SP, in which the image data CP obtained after the gamma curve conversion processing and the oblique-view image data SP are combined alternately on a sub-pixel-by-sub-pixel basis to produce the image data VP obtained after the combining processing.

In the first example of combining processing illustrated in FIG. 10, specifically, each of the pixels in which n and m are odd numbers or in which n and m are even numbers is represented by VP(n, m, R)=CP(n, m, R)
VP(n, m, G)=SP(n, m, K)
VP(n, m, B)=CP(n, m, B).

Each of the pixels in which n is an odd number and m is an even number or in which n is an even number and m is an odd number is represented by VP(n, m, R)=SP(n, m, K)

VP(n, m, G)=CP(n, m, G)

VP(n, m, B)=SP(n, m, K).

Therefore, the image data VP obtained after the combining processing is configured such that, as illustrated in FIG. 10, the data items having a gray level of 0 ("0k") in the image data CP obtained after the gamma curve conversion processing and the oblique-view image data SP are arranged alternately on a sub-pixel-by-sub-pixel basis for the four pixels at the first row and first column, the first row and second column, the second row and first column, and the second row and second column. For the four pixels at the first row and third column, the first row and fourth column, the second row and third column, and the second row and fourth column, the data items having a gray level of 30 ("30k") in the image data CP obtained after the gamma curve conversion processing and the oblique-view image data SP are arranged alternately on a sub-pixel-by-sub-pixel basis. Similarly, for the four pixels at the third row and first column, the third row and second column, the fourth row and first column, and the fourth row and second column, the data items having a gray level of 30 ("30k") in the image data CP obtained after the gamma curve conversion processing and the oblique-view image data SP are arranged alternately on a sub-pixel-by-sub-pixel basis. For the four pixels at the third row and third column, the third row and fourth column, the fourth row and third column, and the fourth row and fourth column, the data items having a gray level of 0 ("0k") in the image data CP obtained after the gamma curve conversion processing and the oblique-view image data SP are arranged alternately on a sub-pixel-by-sub-pixel basis. The sub-pixels of the pixels at the other rows and columns are also arranged in a similar manner.

In the first example of combining processing, each of the pixels in which n and m are odd numbers or in which n and m are even numbers may be represented by VP(n, m, R)=SP(n, m, K)

VP(n, m, G)=CP(n, m, G)

VP(n, m, B)=SP(n, m, K).

Each of the pixels in which n is an odd number and m is an even number or in which n is an even number and m is an odd number may be represented by VP(n, m, R)=CP(n, m, R)

VP(n, m, G)=SP(n, m, K)

VP(n, m, B)=CP(n, m, B).

FIG. 11 illustrates pixels obtained in a second example of processing for combining the image data CP obtained after the gamma curve conversion processing with the oblique-view image data SP, in which the image data CP obtained after the gamma curve conversion processing and the oblique-view image data SP are combined alternately on a pixel-by-pixel basis to produce the image data VP obtained after the combining processing.

In the second example of combining processing illustrated in FIG. 11, specifically, each of the pixels in which n and m are odd numbers or in which n and m are even numbers is represented by VP(n, m, R)=CP(n, m, R)

VP(n, m, G)=CP(n, m, G)

VP(n, m, B)=CP(n, m, B).

Each of the pixels in which n is an odd number and m is an even number or in which n is an even number and m is an odd number is represented by VP(n, m, R)=SP(n, m, K)

VP(n, m, G)=CP(n, m, K)

VP(n, m, B)=SP(n, m, K).

Therefore, the image data VP obtained after the combining processing is configured such that, as illustrated in FIG. 11, for the four pixels at the first row and first column, the first row and second column, the second row and first column, and the second row and second column, the image data CP obtained after the gamma curve conversion processing is placed in the two pixels at the first row and first column and the second row and second column, and the data having a gray level of 0 ("0k") in the oblique-view image data SP is placed in the two pixels at the first row and second column and the second row and first column. Further, for the four pixels at the first row and third column, the first row and fourth column, the second row and third column, and the second row and fourth column, the image data CP obtained after the gamma curve conversion processing is placed in the two pixels at the first row and third column and the second row and fourth column, and the data having a gray level of 30 ("30k") in the oblique-view image data SP is placed in the two pixels at the first row and fourth column and the second row and third column. Similarly, for the four pixels at the third row and first column, the third row and second column, the fourth row and first column, and the fourth row and second column, the image data CP obtained after the gamma curve conversion processing is placed in the two pixels at the third row and first column and the fourth row and second column, and the data having a gray level of 30 ("30k") in the oblique-view image data SP is placed in the two pixels at the fourth row and first column and the third row and second column. Further, for the four pixels at the third row and third column, the third row and fourth column, the fourth row and third column, and the fourth row and fourth column, the image data CP obtained after the gamma curve conversion processing is placed in the two pixels at the third row and third column and the fourth row and fourth column, and the data having a gray level of 0 ("0k") in the oblique-view image data SP is placed in the two pixels at the third row and fourth column and the fourth row and third column. The sub-pixels of the pixels at the other rows and columns are also arranged in a similar manner.

In the second example of combining processing, each of the pixels in which n and m are odd numbers or in which n and m are even numbers may be represented by VP(n, m, R)=SP(n, m, K)

VP(n, m, G)=CP(n, m, K)

VP(n, m, B)=SP(n, m, K).

Each of the pixels in which n is an odd number and m is an even number or in which n is an even number and m is an odd number may be represented by VP(n, m, R)=CP(n, m, R)

VP(n, m, G)=CP(n, m, G)

VP(n, m, B)=CP(n, m, B).

Schematic Configuration of Mobile Phone Terminal

Figure 12:
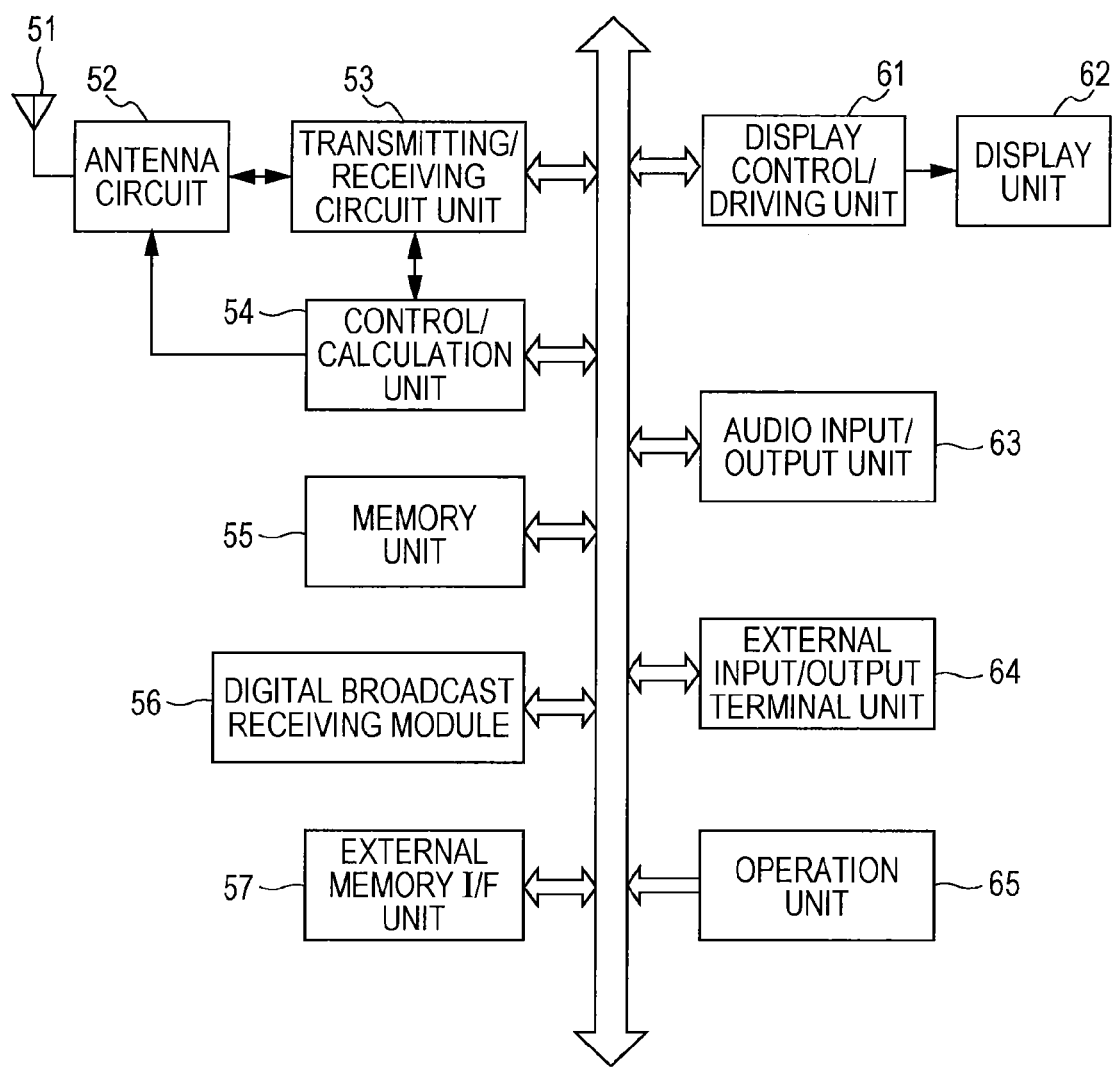
FIG. 12 is a block diagram illustrating an example schematic internal configuration of a mobile phone terminal including the display device according to the embodiment.

FIG. 12 illustrates an example schematic internal configuration of a mobile phone terminal including the display device according to the embodiment.

Referring to FIG. 12, a communication antenna 51 may be an internal antenna, by way of example, through which a call or electronic mail is transmitted and received and signal radio waves are transmitted and received to communicate with the Internet or the like via a mobile phone network. An antenna circuit 52 includes, for example, an antenna switch, a matching circuit, and a filter circuit, and a transmitting/receiving circuit unit 53 performs frequency conversion of transmission and reception signals, modulation and demodulation, and any other suitable operation. The mobile phone terminal according to the embodiment is capable of obtaining various data and application programs through communication using the communication antenna 51 and the antenna circuit 52.

An audio input/output unit 63 includes a speaker, a peripheral circuit thereof, a microphone, and a peripheral circuit thereof. The speaker and the peripheral circuit thereof may be a speaker provided in a mobile phone terminal and used as an earpiece for outputting ringer (ringtone), alarm sound, and various audio messages, and a peripheral circuit of such a speaker, and are adapted to convert an audio signal supplied from a control/calculation unit 54 into an acoustic wave and to output the acoustic wave in the air. The microphone and the peripheral circuit thereof may be a microphone used as a mouthpiece for collecting external sound, and a peripheral circuit of such a microphone, and are adapted to convert an acoustic wave into an audio signal and to send the audio signal to the control/calculation unit 54. The peripheral circuits include, for example, an amplification circuit for the speaker, an amplification circuit for the microphone, an expansion decoding circuit that expands and decodes compressed and encoded audio data supplied from the control/calculation unit 54, a digital/analog conversion circuit that converts expanded and decoded digital audio data into an analog audio signal, an analog/digital conversion circuit that converts an analog audio signal input from the microphone into digital audio data, and a compression encoding circuit that compresses and encodes the digital audio data.

A display unit 62 corresponds to the display unit 12 illustrated in FIG. 1 described above, and includes, for example, the liquid crystal panel 26, the LCD driver 24, and the LED 25.

A display control/driving unit 61 corresponds to the display control unit 11 illustrated in FIG. 1 described above, and includes, for example, the LCD controller 22 and the LED driver 23.

An operation unit 65 includes operation elements provided on a housing (not illustrated) of the mobile phone terminal according to the embodiment, such as keys including a ten-key pad, a start call key, and an end call/power key, a cross-key, and a jog dial, and an operation signal generator that generates an operation signal when the operation elements are operated. In the mobile phone terminal according to the embodiment, the operation unit 65 further includes a touch panel. The touch panel may be, for example, a transparent touch panel, and may be placed on a screen of the liquid crystal panel 26 of the display unit 62.

An external input/output terminal unit 64 includes, for example, a cable connection connector for use in data communication via a cable, an interface circuit for use in external data communication, a charging terminal for charging an internal battery via a power supply cable or the like, and a charging interface circuit therefor. Thus, the mobile phone terminal according to the embodiment is capable of loading various data and application programs via the external input/output terminal unit 64.

An external memory interface (I/F) unit 57 includes, for example, an external memory slot into which an external memory is detachably inserted, and an interface circuit for communicating data in the external memory. Thus, the mobile phone terminal according to the embodiment is capable of loading various data and application programs via the external memory.

A digital broadcast receiving module 56 includes an antenna and a tuner for receiving so-called digital television broadcasts, digital radio broadcasts, and the like. The digital broadcast data received by the digital broadcast receiving module 56 is subjected to processing such as compression by, for example, the control/calculation unit 54, and can be thereafter stored (or recorded) in a memory unit 55 or the like. The mobile phone terminal according to the embodiment is also capable of obtaining various data and application programs, which may be provided via display broadcasting, through the digital broadcast receiving module 56.

The memory unit 55 includes, for example, an internal memory provided in the terminal, and a removable card-like memory that stores Subscriber Identity Module (SIM) information and the like. The internal memory includes a read only memory (ROM) and a random access memory (RAM). The ROM stores an operating system (OS), a control program for allowing the control/calculation unit 54 to control each unit, device information about the terminal, various initial setting values, dictionary data, various sound data, various application programs, and the like. The ROM includes a rewritable ROM such as a NAND-type flash memory or an electrically erasable programmable read-only memory (EEPROM), and is configured to be capable of saving electronic mail data, data of a telephone book and an electronic mail address book, still image and moving image content data, and other information such as various user setting values. The various data and application programs stored in the memory unit 55 may not necessarily be provided in advance, and also includes data and application programs obtained via the communication described above, the external memory, the external input/output terminal unit 64, or the like. The RAM serves as a work area when the control/calculation unit 54 performs various types of data processing or as a buffer area to store data at a suitable time.

Although not illustrated in the figures, the mobile phone terminal according to the embodiment also includes elements provided in a general mobile information terminal, such as a near field communication module such as a wireless local area network (LAN) module or a Bluetooth (registered trademark) module, a camera unit configured to capture a still image or a moving image, a non-contact communication module that performs non-contact communication, which may be used in, for example, a Radio Frequency-Identification (RFID) system, a non-contact integrated circuit (IC) card, or the like, a global positioning system (GPS) module configured to detect the current position or movement of the mobile phone terminal, various sensors configured to detect acceleration and/or direction of movement, temperature, humidity, etc., a clock unit that measures duration and/or time, a battery configured to supply power to each unit, and a power management IC designed to control the supply of power.

The control/calculation unit 54 corresponds to the CPU unit 10 illustrated in FIG. 1 described above, and controls each unit such as the transmitting/receiving circuit unit 53, the display control/driving unit 61, the audio input/output unit 63, the external input/output terminal unit 64, the digital broadcast receiving module 56, the external memory I/F unit 57, the GPS module, the non-contact communication module, the near field communication module, the camera unit, the various sensors, or the operation unit 65, and further performs various calculations as necessary. The control/calculation unit 54 also executes the control program and various application programs stored in the memory unit 55.

Operation Flow for Obtaining Viewing Angle Control Application Program

In the embodiment, a viewing angle control application program for implementing the viewing angle control described above may be provided at the time of shipment of the mobile phone terminal from the factory, or may also be obtained separately via, for example, as described above, communication, an external memory, the external input/output terminal unit 64, or the like.

FIG. 13 illustrates a flow of a process performed when the mobile phone terminal according to the embodiment obtains the viewing angle control application program described above and the control/calculation unit 54 executes the viewing angle control application program. The viewing angle control application program may be started in accordance with an instruction from a user or may be automatically started when the power of the mobile phone terminal is turned on.

In the flowchart illustrated in FIG. 13, when the viewing angle control application program is started, first, in the processing of step S1, the control/calculation unit 54 determines whether or not initial setting for viewing-angle control has been completed. Here, examples of the initial setting for viewing-angle control may include the setting of a display type indicating which of the VA, TN, and ECB types the liquid crystal panel mounted in the mobile phone terminal according to the embodiment is of, the setting of use of the conversion table capable of executing the gamma conversion processing optimum to the viewing angle control on the viewing angle characteristics of the liquid crystal panel, and the setting of use of oblique-view image data optimum to the viewing angle control on the viewing angle characteristics of the liquid crystal panel. The viewing angle characteristics of the liquid crystal panel differ depending on the VA, TN, or ECB type, and also differ depending on the manufacturer, production lot, and model name of the liquid crystal panel. Therefore, preferably, a conversion table used for gamma conversion processing for viewing-angle control and oblique-view image data, each of which is optimum to the viewing angle characteristics of the liquid crystal panel, are used. In the embodiment, therefore, when the viewing angle control application program is executed, initial setting is performed for the type and viewing angle characteristics of the liquid crystal panel mounted in the mobile phone terminal so that a conversion table used for gamma conversion processing and oblique-view image data, which are optimum to the viewing angle control, are used. If it is determined in the determination processing of step S1 by, for example, checking an initial setting completion flag or the like, that the initial setting for viewing-angle control has not been performed, the control/calculation unit 54 proceeds the process to step S2. It may be determined that the initial setting for viewing-angle control has not been performed, for example, when the viewing angle control application program is first launched after the user separately obtains the program and installs the program into the mobile phone terminal according to the embodiment.

In the processing of step S2, the control/calculation unit 54 determines the model name, display type, and the like of the mobile phone terminal on the basis of the device information saved in the memory unit 55. If the device information does not include information such as the model name or display type of the mobile phone terminal, the control/calculation unit 54 may perform determination by, for example, accessing the mobile phone service center of the mobile phone terminal or any other suitable place through the transmitting/receiving circuit unit 53 and by querying the mobile phone service center or the like for the model name, display type, and the like of the mobile phone terminal. After the determination processing of the model name or display type, the control/calculation unit 54 proceeds the process to step S3.

In the processing of step S3, the control/calculation unit 54 obtains oblique-view image data optimum to the model name and display type of the mobile phone terminal, that is, oblique-view image data optimum to the viewing angle control with respect to the viewing angle characteristics of the liquid crystal panel mounted in the mobile phone terminal. Also, in the processing of step S4, the control/calculation unit 54 also obtains a conversion table used for gamma curve conversion processing optimum to the model name and display type of the mobile phone terminal, that is, a conversion table optimum to the viewing angle control with respect to the viewing angle characteristics of the liquid crystal panel mounted in the mobile phone terminal. In this case, for example, the control/calculation unit 54 may access the mobile phone service center of the mobile phone terminal or any other suitable place, and may obtain oblique-view image data and a conversion table that are optimum to the model name and display type of the mobile phone terminal from the mobile phone service center or the like. That is, in this example, the mobile phone service center stores, for each model name and each display type, oblique-view image data and a conversion table that are optimum to viewing angle control. In response to a request for obtaining the model name and display type from a mobile phone terminal, the mobile phone service center provides the mobile phone terminal with the oblique-view image data and conversion table optimum to the model name and display type of the terminal. Oblique-view image data and a conversion table optimum to each mode and each display type may be provided in advance in the viewing angle control application program. In this case, the control/calculation unit 54 selects oblique-view image data and a conversion table, which are optimum to viewing angle control for the model name and display type of the mobile phone terminal, from among a plurality of pieces of oblique-view image data and conversion tables provided in the program in advance.

After oblique-view image data and a conversion table optimum to the model name and display type of the mobile phone terminal have been obtained, in the processing of step S5, the control/calculation unit 54 saves the obtained oblique-view image data and conversion table in a non-volatile storage area of the memory unit 55. Then, the control/calculation unit 54 sets an initial setting completion flag indicating that the initial setting for viewing-angle control has been completed, and then returns the process to step S1.

If it is determined in the processing of step S1 that the initial setting for viewing-angle control has been completed because the initial setting completion flag has been set, the control/calculation unit 54 proceeds the process to step S10.

In the processing of step S10, the control/calculation unit 54 determines to which of the narrow viewing angle mode and the wide viewing angle mode described above the current viewing angle control mode has been set. As described above, the viewing angle control mode may be switched between the narrow viewing angle mode and the wide viewing angle mode in accordance with an instruction from a user or under the control of the control/calculation unit 54 itself.

If it is determined in step S10 that the wide viewing angle mode has been set, the control/calculation unit 54 proceeds the process to step S14, in which, as described above in FIG. 5, the original image data OP is used directly as the display image data vp to be displayed on the liquid crystal panel 26. This enables the display in the wide viewing angle mode that allows the users UA, UB, and UC to view the images vua, vub, and vuc, respectively, which are substantially the same. After the processing of step S14, the control/calculation unit 54 returns the process to step S10.

If it is determined in step S10 that the narrow viewing angle mode has been set, on the other hand, the control/calculation unit 54 proceeds the process to step S11.

In the processing of step S11, as described above in FIG. 3, the control/calculation unit 54 performs gamma curve conversion processing on the original image data OP using a conversion table used for the gamma curve conversion processing.

Then, in the processing of step S12, the control/calculation unit 54 combines the image data CP obtained after the gamma curve conversion processing with the oblique-view image data SP to produce composite image data VP.

Then, in the processing of step S13, the control/calculation unit 54 uses the composite image data VP as display data to be displayed on the liquid crystal panel 26. Thus, the image in the narrow viewing angle mode is displayed on the display screen. After the processing of step S13, the control/calculation unit 54 returns the process to step S10.

As described above, an embodiment of the present invention provides a beneficial effect of prevention of peeping or viewing from either side in a narrow viewing angle mode. In the embodiment, furthermore, a display image in the narrow viewing angle mode may be a composite image obtained by combining image data obtained after gamma curve conversion processing, which is performed by referring to a conversion table provided in advance, with oblique-view image data provided in advance. That is, according to the embodiment, no calculations are involved in gamma curve conversion processing or image data combining processing, resulting in a reduction in the load on a CPU. No additional configuration or high-performance CPU for calculations may be used, and substantially no additional cost may be introduced. According to the embodiment, furthermore, viewing angle control that takes into account the viewing angle characteristics of a liquid crystal panel provides a beneficial effect of prevention of peeping or viewing from oblique directions in the narrow viewing angle mode while keeping a front-view image clearly visible without substantially degrading the quality of the front-view image. According to the embodiment, moreover, appropriate switching between the narrow viewing angle mode and the wide viewing angle mode can be realized.

The foregoing embodiment is merely an exemplary embodiment of the present invention. It is to be understood that the present invention is not limited to the foregoing embodiment and a variety of changes can be made in terms of design or the like without departing from the technical concept of the present invention.

A display device according to an embodiment of the present invention can also be used in an apparatus other than a mobile phone terminal, such as a PDA, a compact notebook personal computer, a mobile game console, a mobile digital television receiver, or a mobile navigation terminal.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
    a liquid crystal display panel having predetermined viewing angle characteristics associated with a type and a model of the liquid crystal display panel;
    an image data conversion unit configured to convert original image data but not predetermined oblique-view image data to converted image data that has been gamma corrected so that
        a luminance difference in a portion of a lower half of a full gray scale range is not substantially changed after conversion, and
        a luminance difference in a portion of an upper half of the full gray scale range after conversion becomes smaller than a luminance difference before conversion;
    a semiconductor memory configured to hold predetermined oblique-view image data corresponding to the predetermined viewing angle characteristics associated with the type and model of the liquid crystal display panel, wherein in
    the predetermined oblique-view image data not being gamma-corrected, the predetermined oblique-view image data being a different image than an image from the original image data; and
    an image combining unit configured to combine the converted image data with the predetermined oblique-view image data to generate composite image data that is displayed on a single liquid crystal layer of the liquid crystal display panel.

2. The display device according to claim 1, wherein each pixel of an image includes a first sub-pixel, a second sub-pixel, and a third sub-pixel, and
    wherein the image combining unit generates the composite image data by combining the converted image data with the predetermined oblique-view image data alternately on a sub-pixel-by-sub-pixel basis.

3. The display device according to claim 1, wherein each pixel of an image includes a first sub-pixel, a second sub-pixel, and a third sub-pixel, and
    wherein the image combining unit generates the composite image data by combining the converted image data with the predetermined oblique-view image data alternately on a pixel-by-pixel basis.

4. The display device according to claim 1, wherein the predetermined oblique-view image data represents a monochrome image including only data having a gray level in a predetermined range.

5. The display device according to claim 4, wherein the gray level for the image data ranges in an inclusive range of 0 through 255, and the predetermined range of gray level extends between 0 and 30.

6. A method for controlling a viewing angle of a display device including a liquid crystal display panel having predetermined viewing angle characteristics, comprising:
    converting, by an image data conversion unit, original image data but not predetermined oblique-view image data to converted image data that has been gamma corrected to be displayed on the liquid crystal display panel so that a luminance difference in a portion of a lower half of a full gray scale range does not substantially change after conversion and so that a luminance difference in a portion of an upper half of the full gray scale range after conversion becomes smaller than a luminance difference obtained before conversion;
    combining, by an image combining unit, the converted image data with predetermined oblique-view image data corresponding to the predetermined viewing angle characteristics of the liquid crystal display panel to generate composite image data, wherein
    the oblique-view image data not being gamma-corrected, the predetermined oblique-view image data being a different image than an image from the original image data; and displaying the composite image data generated by the image combining unit on a single liquid crystal layer liquid crystal display panel.

7. A non-transitory computer storage device having instructions that when executed by a computer processor perform a method of controlling a viewing angle of a display device including a liquid crystal display panel having predetermined viewing angle characteristics, the method including:
- converting original image data but not predetermined oblique-view image data to converted image data that has been gamma corrected to be displayed on the liquid crystal display panel so that a luminance difference in a portion of a lower half of a full gray scale range does not substantially change after conversion and so that a luminance difference in a portion of an upper half of the full gray scale range after conversion becomes smaller than a luminance difference obtained before conversion;
- combining the converted image data with predetermined oblique-view image data corresponding to the predetermined viewing angle characteristics of the liquid crystal display panel to generate composite image data, wherein the predetermined oblique-view image data not being gamma-corrected, the predetermined oblique-view image data being a different image than an image from the original image data; and
- displaying the composite image data generated by the image combining unit on a single liquid crystal layer liquid crystal display panel.

8. A mobile terminal comprising:
- a liquid crystal display panel having predetermined viewing angle characteristics;
- an image data conversion unit configured to convert original image data but not predetermined oblique-view image data to converted image data that has been gamma corrected to be displayed on the liquid crystal display panel so that
- a luminance difference in a a portion of a lower half of a full gray scale range is not substantially changed after conversion, and
- a luminance difference in a portion of an upper half of the full gray scale range after conversion becomes smaller than a luminance difference obtained before conversion;
- a semiconductor memory configured to hold predetermined oblique-view image data corresponding to the predetermined viewing angle characteristics of the liquid crystal display panel, wherein the predetermined oblique-view image data not being gamma-corrected, the predetermined oblique-view image data being a different image than an image from the original image data; and
- an image combining unit configured to combine the converted image data with the predetermined oblique-view image data to generate composite image data,
- wherein the composite image data generated by the image combining unit is displayed on a single liquid crystal layer of the liquid crystal display panel.

* * * * *